Feb. 22, 1955 N. C. ROBERTSON 2,702,741
TOWER REACTOR
Filed July 19, 1951
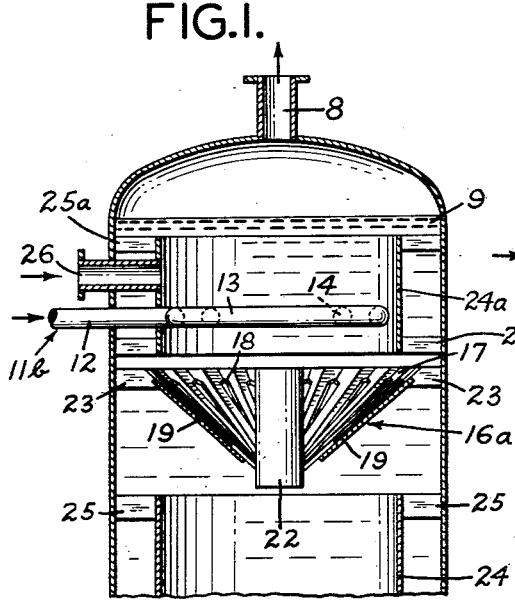
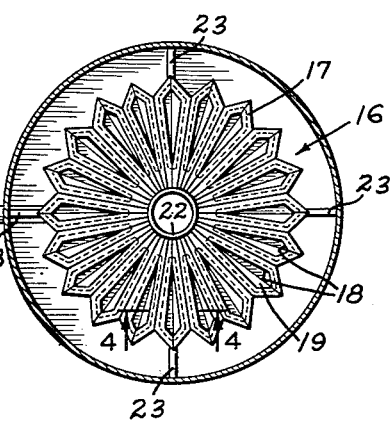
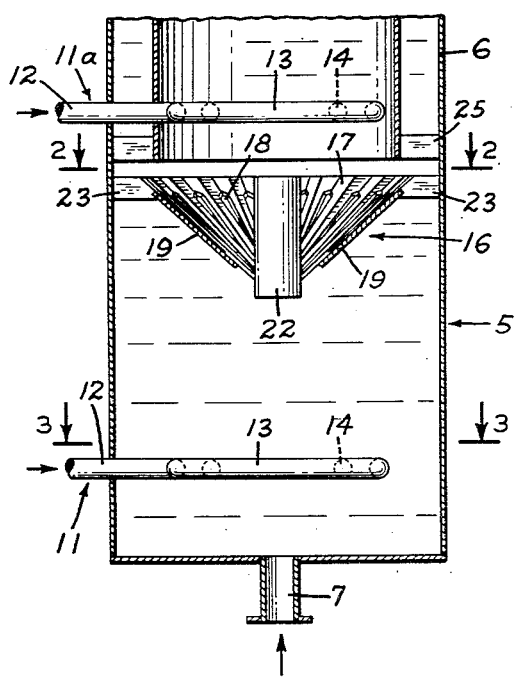
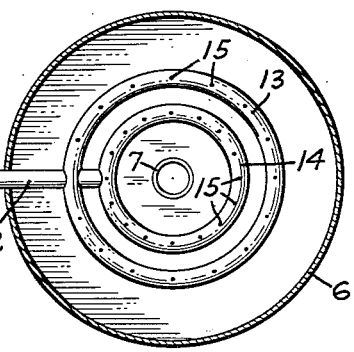
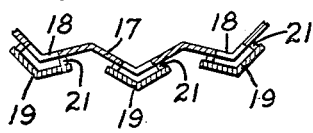
INVENTOR.
NAT C. ROBERTSON
BY
ATTORNEYS.

United States Patent Office 2,702,741
Patented Feb. 22, 1955

2,702,741

TOWER REACTOR

Nat C. Robertson, Cambridge, Mass., assignor to Celanese Corporation of America, New York, N. Y., a corporation of Delaware Application July 19, 1951, Serial No. 237,509

8 Claims. (Cl. 23—283)

This invention relates to reaction vessels, and relates more particularly to an improved reaction vessel provided with baffles and adapted to be employed for effecting gas-liquid reactions as, for example, the liquid phase oxidation of hydrocarbons employing air or other oxygen-containing gas as the oxidizing agent.

An object of this invention is to provide a reaction vessel wherein a reactive gaseous phase may be brought into intimate contact with a reactive liquid phase to effect a gas-liquid reaction.

Another object of this invention is the provision of a reaction vessel particularly suitable for gas-liquid reactions wherein a gaseous reactant containing both a reactive and a non-reactive component is employed, and the non-reactive gaseous component may be deflected from the immediate reaction zone when the reactive gaseous component has reacted completely.

Other objects of this invention will appear from the following detailed description and the accompanying drawing.

In the drawing,

Fig. 1 is a vertical sectional view of the novel gas-liquid reactor of my invention, Fig. 2 is a cross-sectional view of said reactor taken along the line 2—2 in Fig. 1, in the direction of the arrows, Fig. 3 is a cross-sectional view of said reactor taken along the line 3—3 in Fig. 1 in the direction of the arrows, and Fig. 4 is a sectional view of a portion of the reactor taken along the line 4—4 in Fig. 2.

Like numerals indicate like parts throughout the several views of the drawing.

In carrying out gas-liquid reactions wherein a reactive gas is brought into contact with a reactive liquid, effective control of the reaction may be obtained, for example, by diluting the reactive gas with a suitable inert gaseous diluent so as to decrease the effective concentration of the reactive gas. For greater efficiency, the reactive gas or gas mixture should be introduced into the liquid in as finely-divided a form as possible so that the greatest possible area of contact is attained at the gas-liquid interface. When operating properly, under favorable temperature and pressure conditions, the gas-liquid reaction usually takes place quite rapidly. The reactive gas is substantially entirely consumed and the gas remaining is essentially inert. Although initially introduced as finely-divided bubbles, the gas bubbles thus introduced usually coalesce or agglomerate as they rise through the liquid and, after traveling a very short distance form rather large bubbles which react much less effectively. Accordingly, for the most efficient reaction conditions involving gas-liquid contact, the finely-divided gas should be simultaneously introduced at several different levels in the reactive liquid. There is, however, one unsatisfactory result when operating in this manner. Since the finely-divided bubbles from the lower level coalesce quite rapidly, they tend to entrain the smaller bubbles which are being introduced at the higher levels before all of the oxygen in said smaller bubbles has reacted. As the oxygen present in large bubbles is less effectively utilized than when present in bubbles of smaller diameter, this effect during gas-liquid reactions is undesirable since it decreases reaction efficiency. To avoid this decrease in efficiency due to entrainment, I have provided a reactor of novel construction.

Referring now to the drawings, and more particularly to Fig. 1 there is shown a gas-liquid reactor, generally indicated by reference numeral 5, comprising an outer shell 6 and provided with an inlet 7 through which a liquid reactant or reactants may be introduced and an outlet 8 through which any vapors or unreacted gas leaving the surface of liquid 9 may be removed. Spaced along the length of reactor 5 are a plurality of gas dispersion headers, indicated by reference characters 11, 11a and 11b, each of which is similar in construction. Each of said gas headers comprises an inlet 12 communicating with a pair of concentric annular rings 13 and 14, each of which is provided with a series of holes 15 of relatively small diameter. When a gas under pressure is forced into said headers 11, 11a and 11b, through inlet 12, the gas leaves said headers through holes 15 and passes upward through liquid 9 in the form of fine bubbles.

Alternating with said gas headers 11, 11a and 11b along the length of reactor 5 are generally conical baffles 16 and 16a. Although only two baffles and three gas headers are shown, it will be understood that any suitable number of gas headers and baffles may be employed depending upon the length of the reactor 5 and requirements of the reaction involved. Baffles 16 and 16a consist of a fluted surface 17 having a plurality of openings 18, each of which is provided with an individual baffle plate 19 attached to baffle 16 by means of studs 21. An open cylindrical passage 22 is provided through the central portion of the baffles 16 and 16a. The entire baffle structure assembly is supported in shell 6 by means of a plurality of radial brackets 23.

Additional baffle means are provided in the central portion of reactor 5, said baffle means consisting of a cylinder 24 which is open at both the top and bottom and is supported in the desired vertical position in reactor 5 by a series of supporting brackets 25. A plurality of cylindrical baffles 24 may also be employed and in similar position relative to each of the several gas headers and conical baffles employed in forming my novel structure. One such other baffle 24a is shown about header 11b. An opening 26 is provided communicating with said cylindrical baffle 24a through which liquid may be introduced.

When the novel reactor of my invention is employed for gas-liquid reactions, such as, for example, the oxidation of a liquid with gaseous oxygen, the reactor 5 is charged with the desired liquid or liquid mixture which is to be reacted, and air or other oxidizing gas mixture is introduced under suitable pressure into gas dispersion headers 11, 11a and 11b. The air leaves the gas dispersion headers through holes 15 in the form of fine bubbles and the latter rise upwardly through the liquid 9, the oxygen in the air bubbles simultaneously reacting with the liquid. As the bubbles rise, oxygen is rapidly depleted and at the same time the bubbles agglomerate and form bubbles of a much greater diameter which tend to rise at a relatively higher linear velocity.

If the interior of the reactor 5 were entirely open, the large bubbles would, in addition to rising very rapidly, agglomerate with the smaller bubbles entering through the several gas headers situated above before the oxygen in the smaller bubbles is depleted. Such action would quickly reduce the efficiency of the reaction since the oxygen present in the larger bubbles thus formed is, as pointed out above, much less effective due to the very much smaller surface-to-volume ratio of the larger bubbles as compared to the greater and more effective surface-to-volume ratio of smaller bubbles. This undesirable result is successfully avoided by my novel structure.

In the reactor structure of my invention, fluted baffle 16 is positioned above dispersion header 11 while fluted baffle 16a is positioned above gas header 11a. The respective baffles lie in the path of the rising gas bubbles so as to intercept said rising, agglomerated bubbles. Most advantageously, the conical baffles are so positioned that said rising bubbles are deflected at the point where the oxygen present therein has been consumed. The bubbles are deflected outwardly by the flutes in the surface 17 which forms a portion of the fluted baffle structures 16 and 16a. The smaller individual baffles 19 prevent the rising bubbles from passing through holes 18 in the fluted surface 17. Thus, the rising bubbles are deflected so as to pass up through reactor 5 along the walls of shell 6, the path of travel being defined by the outer surface of cylindrical baffle 24, and the inside surface of reactor shell 6. Accordingly, the air which is introduced in the form of small bubbles through header 11a, for example, is able to act most effectively upon the liquid 9 since it passes upwardly undisturbed within the zone defined by cylindrical baffle 24. The spent gas from intermediate air disperser 11a strikes the upper baffle 16a and, in turn, is deflected outwardly along the wall of shell 6 thus permitting the finely-divided air bubbles entering through upper air dispersion header 11b to act without excessive agglomeration upon the liquid in the upper portion of reactor 6. Baffle 24a guides the gas bubbles deflected by upper baffle 16a along the walls of shell 6 thus permitting the air to pass upwardly undisturbed within baffle 24a. Baffle 24a is supported by a plurality of brackets 25a. The cylindrical opening 22 in each of baffles 16 and 16a acts to insure free passage of liquid downwardly within the reactor, while openings 18 also permit the downward passage of liquid which is carried upward by the gas-lift action of the air bubbles passing upwardly.

It is to be understood that the foregoing detailed description is given merely by way of illustration and that many variations may be made therein without departing from the spirit of my invention.

Having described my invention, what I desire to secure by Letters Patent is:

1. In a reactor, the combination of an outer shell for holding a body of liquid, inlet means for introducing a fluid material reactive with said liquid into said shell and outlet means for removing fluid material from said shell, further inlet means spaced from said first mentioned inlet means for introducing another fluid stream reactive with said liquid into said shell, and downwardly pointed conically shaped baffle means having a perforated fluted surface supported within said shell in a position above the inlet means for said second fluid stream so as to intercept the second fluid stream and to deflect said stream outwardly and along the inner wall of said shell, said baffle means having perforations for the passage of said liquid therethrough and a baffle positioned below each of said perforations to deflect said second stream away from said perforations.

2. In a reactor adapted to be employed for gas-liquid contact reactions, the combination of an outer shell for holding a body of liquid, an inlet for introducing said liquid into said shell, at least one inlet comprising a perforated gas dispersion header for introducing a gaseous material reactive with said liquid into said shell, an outlet for removing gases and vapors from said shell, and conical, fluted baffle means within said shell, said conical, fluted baffle means pointing toward said header and being positioned to deflect the gaseous flow through said shell outwardly and along the inner wall of said shell, said baffle means having perforations for the passage of said liquid therethrough and a baffle positioned below each of said perforations to deflect said gaseous material away from said perforations.

3. In a chemical apparatus in which two fluids come in contact with each other, means for controlling the flow of said fluids, comprising a fluted conically shaped baffle, in which the fluting runs along the slant heights of said baffle, said baffle having apertures and secondary baffle means for said apertures positioned directly below the apertures.

4. In a reactor, the combination of an outer shell for holding a body of liquid, upper and lower perforated gas dispersion headers within said body for introducing bubbles of a gas reactive with said liquid, an outlet above said upper header, and a downwardly pointed conical fluted baffle means between said upper and lower headers, said baffle means being positioned to deflect the bubbles from said lower header outwardly along the inner wall of said shell and away from the bubbles introduced by said upper header, said baffle means being provided with perforations for the downward passage of said liquid therethrough, there being a baffle positioned below each of said perforations to deflect the gas bubbles from said lower header away from said perforations.

5. Apparatus as set out in claim 4 in which there is an opening centrally of said conical baffle means for the flow of said liquid therethrough, said passage being spaced laterally from the perforations of said lower header whereby the bubbles from the lower header do not pass through said passage, and in which there are cylindrical baffle means within said shell and spaced from said shell so as to define an annular passage for the flow of said deflected bubbles.

6. In a reactor, the combination of an outer shell for holding a body of liquid, upper and lower perforated gas dispersion headers within said body for introducing bubbles of a gas reactive with said liquid, an outlet above said upper header, baffle means between said upper and lower headers positioned to deflect the bubbles from said lower header outwardly along the inner wall of said shell and away from the bubbles introduced by said upper header, and a cylindrical baffle enclosing and extending upwardly from said upper header and spaced from the outer shell and forming with said outer shell a passageway for the deflected bubbles whereby the deflected bubbles are prevented from mingling with the freshly introduced bubbles from said upper header.

7. In a reactor, the combination of an outer shell for holding a body of liquid, upper and lower perforated gas dispersion headers within said body for introducing bubbles of a gas reactive with said liquid, an outlet above said upper header, baffle means between said upper and lower headers positioned to deflect the bubbles from said lower header outwardly along the inner wall of said shell and away from the bubbles introduced by said upper header, said baffle means being provided with perforations for the downward passage of said liquid therethrough, there being a baffle positioned below each of said perforations to deflect the gas bubbles from said lower header away from said perforations, and a cylindrical baffle enclosing and extending upwardly from said upper header and spaced from the outer shell and forming with said outer shell a passageway for the deflected bubbles whereby the deflected bubbles are prevented from mingling with the freshly introduced bubbles from said upper header.

8. In a reactor, the combination of an outer shell for holding a body of liquid, upper and lower perforated gas dispersion headers within said body for introducing bubbles of a gas reactive with said liquid, an outlet above said upper header, downwardly pointed conical fluted baffle means between said upper and lower headers positioned to deflect the bubbles from said lower headers outwardly along the inner wall of said shell and away from the bubbles introduced by said upper header, said baffle means being provided with perforations for the downward passage of said liquid therethrough, there being a baffle positioned below each of said perforations to deflect the gas bubbles from said lower header away from said perforations, and a cylindrical baffle enclosing and extending upwardly from said upper header and spaced from the outer shell and forming with said outer shell a passageway for the deflected bubbles whereby the deflected bubbles are prevented from mingling with the freshly introduced bubbles from said upper header.

References Cited in the file of this patent

UNITED STATES PATENTS

| Number | Name | Date |
| --- | --- | --- |
| 232,222 | Zschech | Sept. 14, 1880 |
| 757,757 | Luhue | Apr. 19, 1904 |
| 767,335 | Evers | Aug. 9, 1904 |
| 852,487 | Zschech | May 7, 1907 |
| 1,651,354 | Alexander | Dec. 6, 1927 |
| 2,009,347 | Sheldon | July 23, 1935 |
| 2,248,677 | Garman | July 8, 1941 |
| 2,569,391 | Stearns | Sept. 25, 1951 |